United States Patent [19]
Miyata et al.

[11] Patent Number: 5,745,892
[45] Date of Patent: Apr. 28, 1998

[54] SWITCHING SYSTEM WITH OAM PROCESSOR CAPABLE OF AUTOMATICALLY UPDATING DIRECTORY TRANSLATION DATA BASE

[75] Inventors: Naohito Miyata; Manabu Inohara, both of Tokyo, Japan

[73] Assignee: NEC Corporation, Japan

[21] Appl. No.: 685,201

[22] Filed: Jul. 23, 1996

[30] Foreign Application Priority Data

Jul. 26, 1995 [JP] Japan .................................. 7-190305

[51] Int. Cl.⁶ .................................................. G06F 17/30
[52] U.S. Cl. .......................... 707/102; 707/200; 707/104; 707/10
[58] Field of Search ................................ 707/102, 200, 707/104, 10

[56] References Cited

U.S. PATENT DOCUMENTS

| | | | |
|---|---|---|---|
| 4,888,698 | 12/1989 | Driessen et al. | 701/200 |
| 5,047,923 | 9/1991 | Elstner et al. | 707/104 |
| 5,274,802 | 12/1993 | Altine | 707/202 |
| 5,390,335 | 2/1995 | Stephan et al. | 395/200.51 |
| 5,432,931 | 7/1995 | Woess et al. | 707/10 |
| 5,640,319 | 6/1997 | Beuning et al. | 364/131 |

*Primary Examiner*—Wayne Amsbury
*Attorney, Agent, or Firm*—Ostrolenk, Faber, Gerb & Soffen, LLP

[57] ABSTRACT

In a telephone switching system, a directory translation data base is created in a read/write memory, a call handling processor makes a search through the data base for reading routing data to establish a connection in a switching network. A copy of the data base is created in a backup memory. An area code is entered through a video display terminal to an OAM processor, which responds to it by making a search through the data base in the backup memory for a corresponding tree structure linking directory translation tables on a digit-by-digit basis and comparing the number of digits in the entered area code is then compared with the number of digits in the corresponding tree structure. If the number of digits in the area code is greater than the number of digits in the corresponding tree structure, the OAM processor creates an (N+1)th table in the backup memory, rewrites an N-th table of the corresponding tree structure with a next table pointer so that the N-th and (N+1)th tables are linked, and writes routing data into the (N+1)th table. If the number of digits in the area code is smaller than the number of digits in the corresponding tree structure, the processor removes an (N+1)th table of the corresponding tree structure and rewrites an Nth table of the corresponding tree structure with routing data. When the backup memory is updated, the OAM processor copies the updated data base onto the read/write memory.

4 Claims, 5 Drawing Sheets

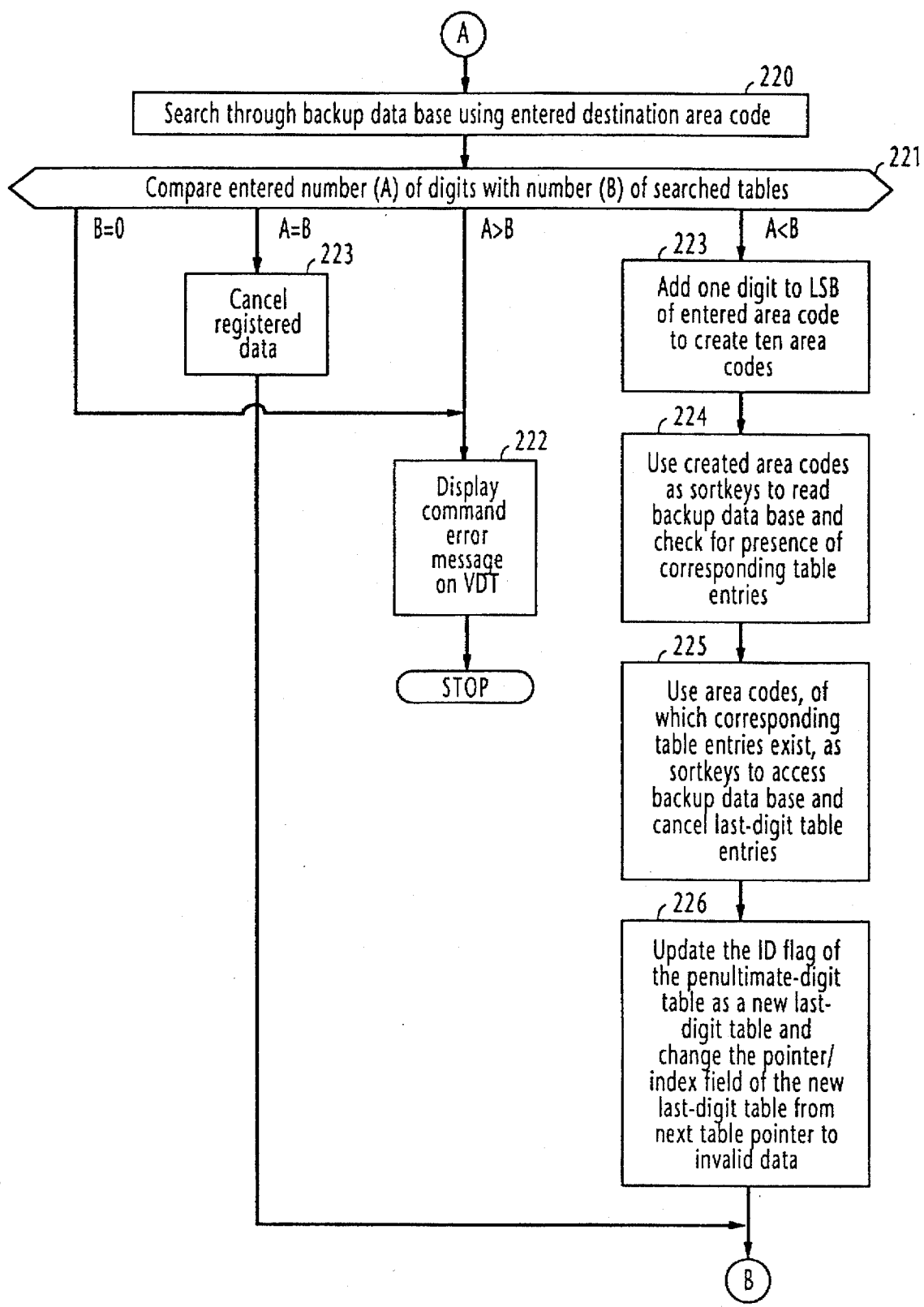

Pre-segmentation

Post-segmentation

Pre-integration

Post-integration

SWITCHING SYSTEM WITH OAM PROCESSOR CAPABLE OF AUTOMATICALLY UPDATING DIRECTORY TRANSLATION DATA BASE

BACKGROUND OF THE INVENTION

1. Field of the Invention

The present invention relates generally to operations, administration and maintenance of telecommunication switching systems, and more specifically to the updating of a directory translation data base which is used by a call handling processor for routing calls.

2. Description of the Related Art

When the national or local numbering plan changes, it is necessary for a switching system to update its directory translation data base. The current practice for updating the data base involves a sequence of manual operations. Maintenance personnel is required to look into a long list of destination area codes to select a desired one. The selected area code is then entered through a keyboard into an OAM (operations, administration and maintenance) processor. By using the entered code as a "sortkey", the processor addresses the data base to search for a desired object and provides a display of directory translation tables on a video screen corresponding to the entered area code. By scanning across the screen, the maintenance personnel would locate desired table entries, and use the keyboard to insert new data, delete and replace their contents in order to segment an area previously identified by a single sortkey into multiple areas, integrate several areas into a single area so that it can be identified by a single sortkey, or cancel tables. However, these manual procedures are of time-consuming and tedious affair and susceptible to human errors. Since the directory translation tables are linked in a tree structure, human errors could result in the corruption of a tree structure which would produce a disastrous consequence when the call handling processor accesses the data base.

SUMMARY OF THE INVENTION

It is therefore an object of the present invention to reduce the amount of manual operations for updating the directory translation data base of a telecommunication switching system.

According to a first aspect of the present invention, there is provided a telephone switching system comprising a data base having a plurality of tables linked digit-by-digit by next table pointers in a tree structure to allow routing data stored in the last-digit table to be read out in response to a sortkey, a video display terminal for manually entering an area code and routing data, and a processor for (a) making a search through the data base for a corresponding tree structure using the entered area code as a sortkey and comparing the number of digits in the entered area code with the number of digits in the corresponding tree structure, (b) creating, in the data base, an (N+1)th table, rewriting an N-th table of the corresponding tree structure with a next table pointer to link the N-th table to the (N+1)th table and writing the entered routing data into the (N+1)th table if the number of digits in the entered area code is N+1 and the number of digits in the corresponding tree structure is N, and (c) removing an (N+1)th table of the corresponding tree structure and rewriting an Nth table of the corresponding tree structure with the entered routing data if the number of digits in the entered area code is N and the number of digits in the corresponding tree structure is N+1. The processor may be additionally responsive to a cancellation command from the video display terminal for removing an (N+1)th table of the corresponding tree structure and rewriting an N-th table of the corresponding tree structure with invalid data if the number of digits in the entered area code is N and the number of digits in the corresponding tree structure is N+1.

According to a second aspect, the telephone switching system of the present invention comprises a switching network to which lines and trunks are terminated, a read/write memory for storing a data base having a plurality of tables linked digit-by-digit by next table pointers in a tree structure to allow routing data stored in the last-digit table to be read out in response to a sortkey, a first processor for making a search through the data base in the read/write memory using a sortkey for reading routing data and establishing a connection in the switching network according to the read routing data, a backup memory for storing a copy of the data base in the read/write memory, a video display terminal for manually entering an area code and routing data, and a second processor. The second processor performs the steps of (a) making a search through the data base in the backup memory for a corresponding tree structure using the entered area code as a sortkey and comparing the number of digits in the entered area code with the number of digits in the corresponding tree structure, (b) if the number of digits in the entered area code is N+1 and the number of digits in the corresponding tree structure is N, creating, in the data base of the backup memory, an (N+1)th table, rewriting an N-th table of the corresponding tree structure with a next table pointer to link the N-th table to the (N+1)th table and writing the entered routing data into the (N+1)th table, (c) if the number of digits in the entered area code is N and the number of digits in the corresponding tree structure is N+1, removing an (N+1)th table of the corresponding tree structure and rewriting an N-th table of the corresponding tree structure with the entered routing data, and (d) copying the data base in the backup memory onto the read/write memory.

BRIEF DESCRIPTION OF THE DRAWINGS

The present invention will be described in further detail with reference to the accompanying drawings, in which:

FIGS. 3A and 3B are flowcharts illustrating the operation of the present invention when updating a directory translation data base;

DETAILED DESCRIPTION

Figure 1:
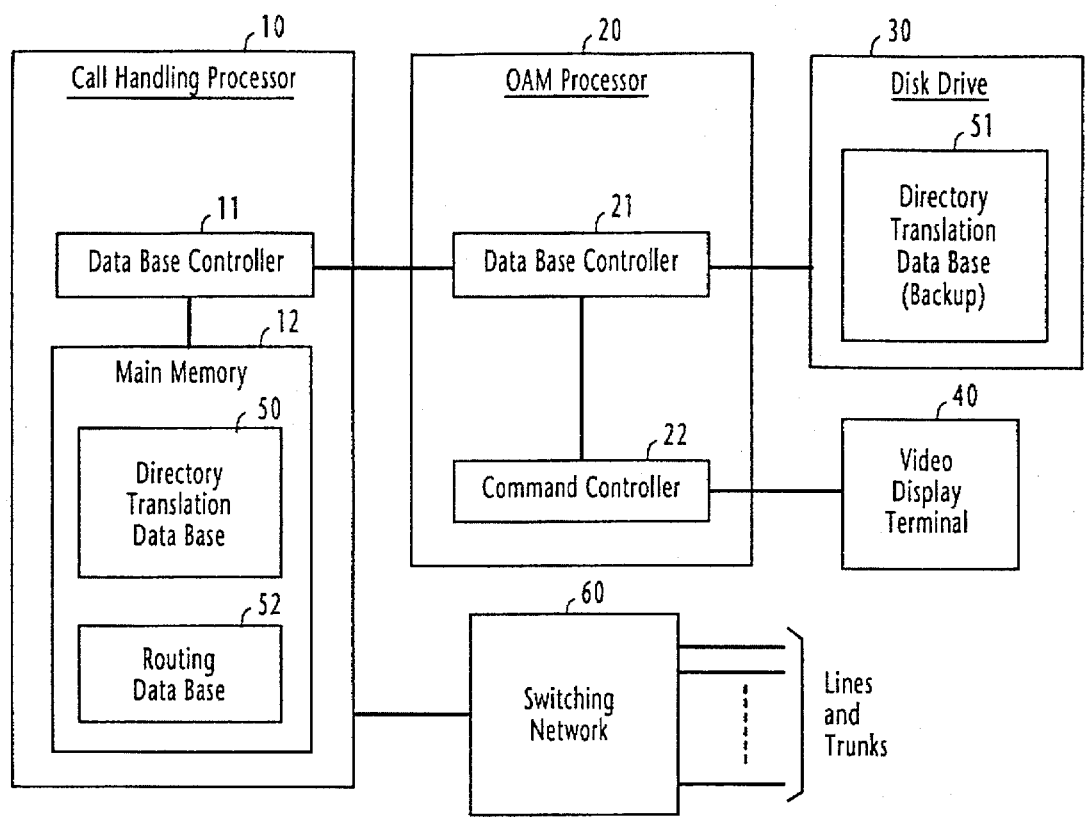
FIG. 1 is a simplified block diagram of a telecommunication switching system incorporating the present invention.

Referring now to FIG. 1, a telecommunication switching system which is essential to carrying out the present invention comprises a switching network 60, a call handling processor 10, an OAM (operations, administration & maintenance) processor 20, and a disk drive 30. The call handling processor 10 includes a data base controller 11 and a main memory (read/write memory) 12 in which a directory translation data base 50 and a routing data base 51 are created. The OAM processor 20 includes a data base controller 21 and a command controller 22. Data base controller 21 is connected between the data base controller 11 and disk drive 30 to create a backup data base 52 which is a copy of the data base 50. The command controller 22 is connected to the data base controller 21. A video display terminal 40 is connected to the command controller 22 to allow maintenance personnel to access the data bases 50 and 52 from a keyboard by entering an update command and providing a display of responses on a video screen. For routing a call, the call handling processor 10 consults with the data base 50 by using digits received from calling subscribers as sortkeys to determine a route index which indicates an outgoing route (trunk group) and then uses the route index as a sortkey to find data in the routing data base 51 specifically indicating a desired outgoing trunk. According to the data obtained from the routing data base 51, the call handling processor 10 controls the switching network 60 to establish a connection between the calling party and the determined outgoing trunk.

Figure 2:
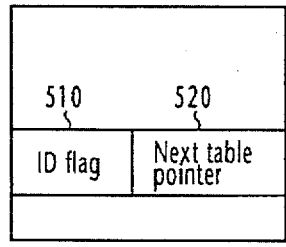
FIG. 2 is an illustration of directory translation tables linked in a tree structure.
Figure 2:
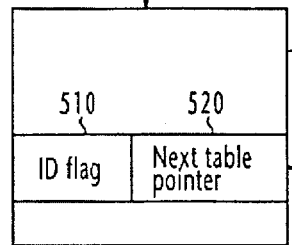
Figure 2:
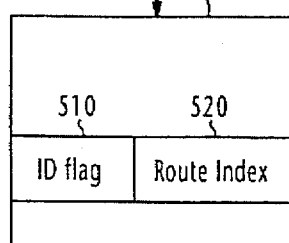

As illustrated in FIG. 2, the directory translation data base 50 essentially comprises a plurality of tables 500 linked together in a tree structure. Each table may be segmented into several entries if more than one digit is required to identify different destinations. Otherwise, only one entry exists for a single destination. As the national or local numbering plan changes with time, a need will arise for the OAM processor to create a new table and segment it into several entries so that they identify new and old destinations, or there will be a need to integrate several entries of an existing table so that the destinations which were individually identified by such entries can be grouped under a "generic" route index and collectively identified by a smaller number of digits than that previously used. For example, if a destination area code is represented by "m" digits, tables 500-1, ..., 500-(m1), 500-m are linked together by the data base controller 11 by first accessing table 500-1, using the first digit of the area code as a sortkey.

Each table entry contains an identification flag field 510 and a pointer/index field 520. The identification flag field gives an indication whether there is a digit to follow for a particular area code or none. The pointer/index field 520 of the first to the (m−1)th tables contains a next table pointer indicating the next table to be accessed and the field 520 of the last-digit table contains a route index.

If a digit-to-follow indication is given by an identification flag field of a table for a particular digit, the controller 11 recognizes that the next data to be searched for is the pointer/index field 520 of the table and uses the next digit as a sortkey to access that pointer/index field. This process is repeated for each digit of a destination area code and the controller 11 finally reaches the identification flag field of the m-th (last) digit table, where it recognizes that there is no digit to follow and proceeds to use the m-th digit as a sortkey to access the pointer/index field 520 of table 500-m that contains a route index. If an identification flag field indicates that it is invalid, the controller 11 recognizes that data to follow is invalid and ends its searching process.

Figure 3A:
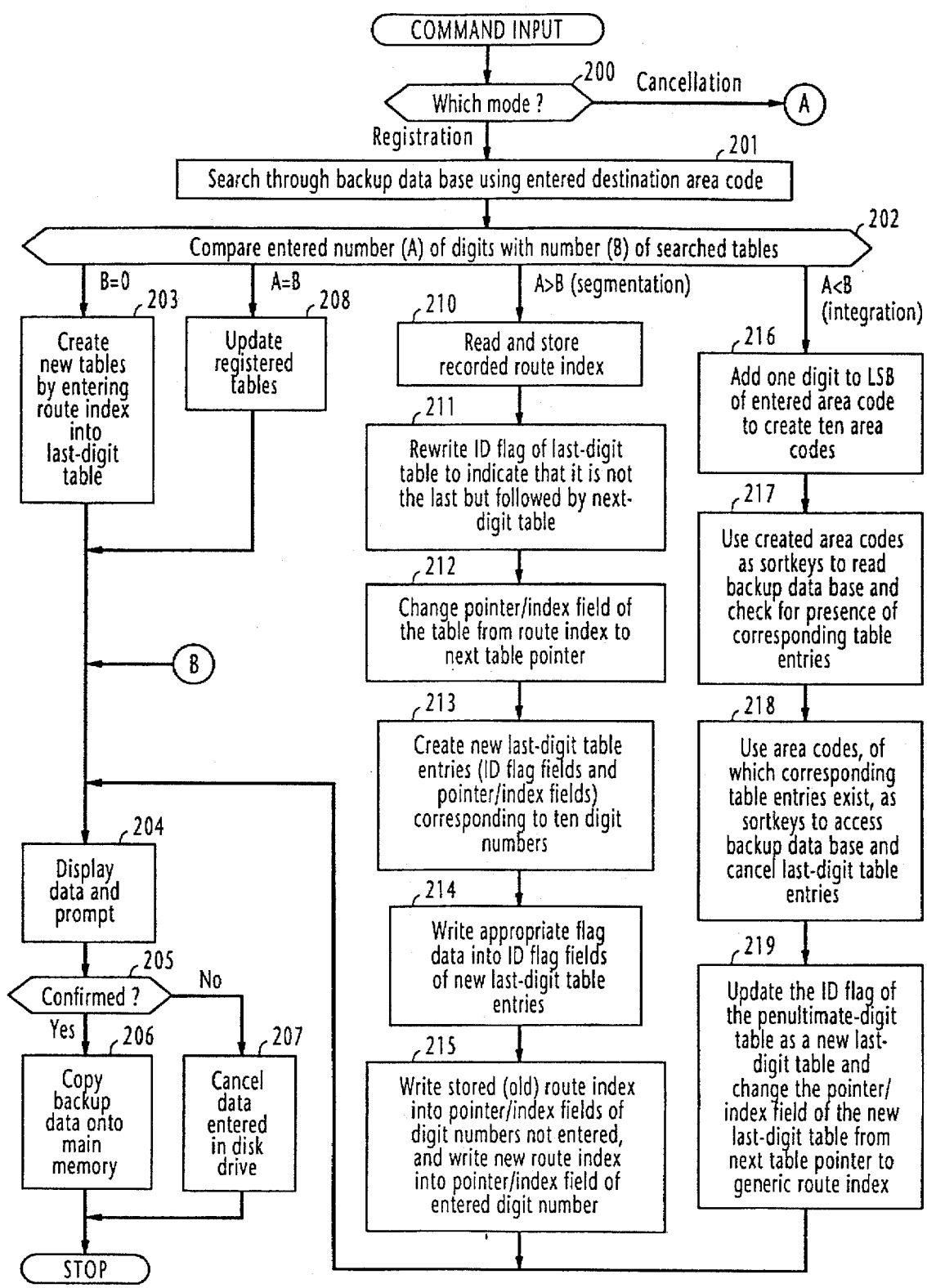

The data base controllers 11 and 21 cooperate with each other for updating the tables in data bases 50 and 52 in response to an update command input from video display terminal 40. The command input includes mode indication data and a destination area code, and may additionally include a route index. The updating process update is illustrated in FIG. 3A, which begins with step 200 which determines whether the command input is a registration mode or a cancellation mode. The registration mode involves the registration of a new destination area code and a new route index and the alternation of recorded data. In the cancellation mode, recorded data is deleted from the data base 52. If it is determined that registration mode is specified by the command, data base controller 21 selects the backup data base 52 in the disk drive and uses the digits of the input area code as sortkeys for making a search through the data base 52 for a corresponding tree structure of tables (step 201) and proceeds to step 202 to compare the number (A) of digits contained in the input area code and the number (B) of the corresponding tables.

If the entered area code has no corresponding tree structure in the data base 52 (i.e., B=0), it is determined that the input command contains a new area code and flow proceeds from step 202 to step 203 to create, in the backup data base 52, a set of new tables linked in a tree form by storing the input route index into the pointer/index field of the last digit table. Flow proceeds to step 204 to provide the display of the new area code and route index on the VDT 40 and a prompt urging the maintenance personnel to confirm the displayed data and to enter an "execution" command if he confirms that no error exists in the registered data (step 205). At step 206, the data newly created in the backup data base 52 is copied onto the data base 50 and flow proceeds to the end of the routine. If the data registered in the backup data base 52 is in error, flow proceeds to step 207 to cancel the data registered in the backup data base 52 before proceeding to the end of the routine.

If the entered area code has a corresponding tree structure in the data base 52 (i.e., A=B), it is determined that the input command is a table update command and flow proceeds from step 202 to step 208 to replace old data contained in the searched tables with new data contained in the input command, and flow proceeds to step 204 for confirmation by the maintenance personnel.

If the number of digits of the new area code is greater than the number of tables detected in the backup data base 52, it is determined that a sortkey segmentation process is required, and flow proceeds from step 202 to step 210 to read and store the route index recorded in the last-digit table into a scratch-pad memory, not shown. Flow proceeds to step 211 to rewrite the identification flag field of the last-digit table with a next table pointer to indicate that this table is not the last but followed by a next-digit table. At step 212, the pointer/index field corresponding to the identification flag field is changed from the route index to a next-table pointer so that the table now becomes the penultimate-digit table. A new last-digit table is then created in the backup data base 52 and this table is segmented into entries corresponding to ten digit numbers (step 213), and appropriate flag data are written into the identification flag fields of the new last-digit table (step 214). At step 215, the old route index stored in the scratch-pad memory is transferred to the pointer/index fields of those digit numbers of the new last-digit table which are not contained in the input command and a new route index is written into the pointer/index field of the new last-digit table corresponding to the last-digit number of the new area code. Following the execution of step 215, flow proceeds to step 204.

Figure 4A:
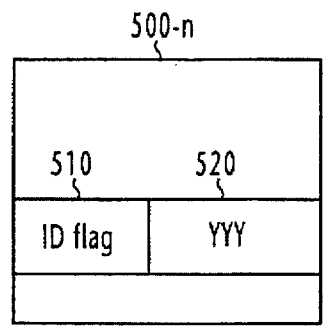
FIGS. 4A and 4B are illustrations of tables in the data base during a segmentation process.
Figure 4B:
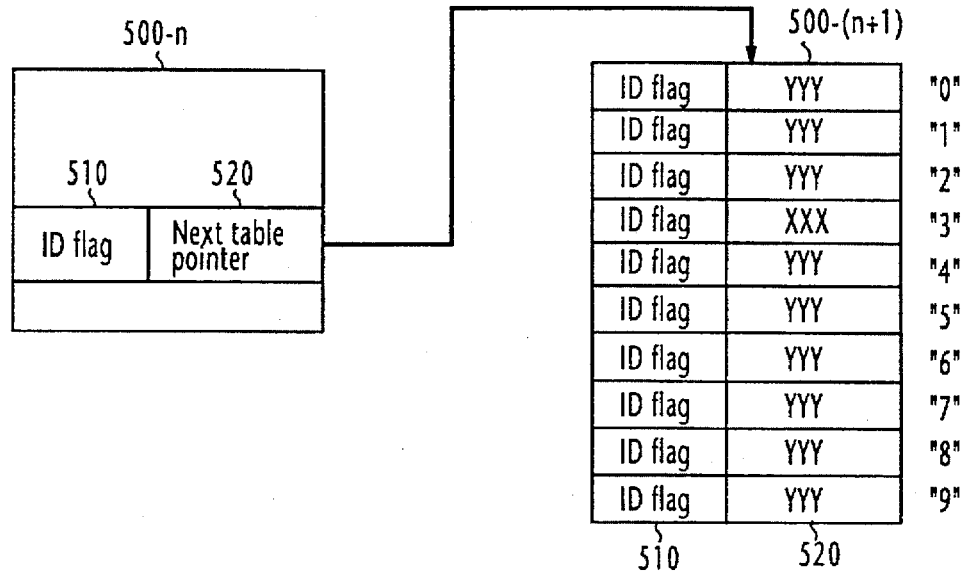

For example, if the entered new destination area code is a three-digit code "123" and the registered area code is a two-digit code "12", the latter is used as a sortkey to access the last-digit table 500-n of the registered area code (where n=3). As shown in FIG. 4A, the data base controller 21 reads an old route index "YYY" from the pointer/index field 520 of the n-th digit (i.e., last-digit) table 500-n into the scratch-pad memory (step 210). The identification field 510 of table 500-n is then rewritten to indicate that there is a table to follow (step 211) and the pointer/index field 520 of the table is overwritten with a next table pointer (step 212) as shown in FIG. 4B. A new last-digit table 500-(n+1) is created (step 213), which is segmented into ten entries corresponding to numbers "0", "1", "2", ..., "9". Appropriate flag data are then written into the ID flag fields of the new last-digit table (step 214) and the old route index "YYY" is transferred from the scratch-pad memory to the pointer/index fields of the last-digit numbers "0" to "2" and "4" to "9" and a new route index "XXX" is written into the pointer/index field of the table corresponding to the last-digit number "3" of the new area code. In this way, the previous sortkey "12" is segmented into ten sortkeys "120" to "129".

If the number of digits of the entered area code is smaller than the number of tables detected in the backup data base 52, it is determined that a sortkey integration process is required, and flow proceeds from step 202 to step 216 to add one digit to the least significant position of the entered area code to create ten area codes. The created area codes are successively used as a sortkey to read the backup data base 52 and check for the presence of corresponding table entries (step 217). At step 218, the area codes of which corresponding table entries are present are successively used as a sortkey to cancel their last-digit table entries. At step 219, the pointer/index field of the penultimate-digit table is rewritten from the next table pointer to a "generic" route index and updates the corresponding identification flag field, so that the penultimate-digit table now becomes the last-digit table. Flow then proceeds to step 204 for confirmation and copying onto data base 50.

Figure 5A:
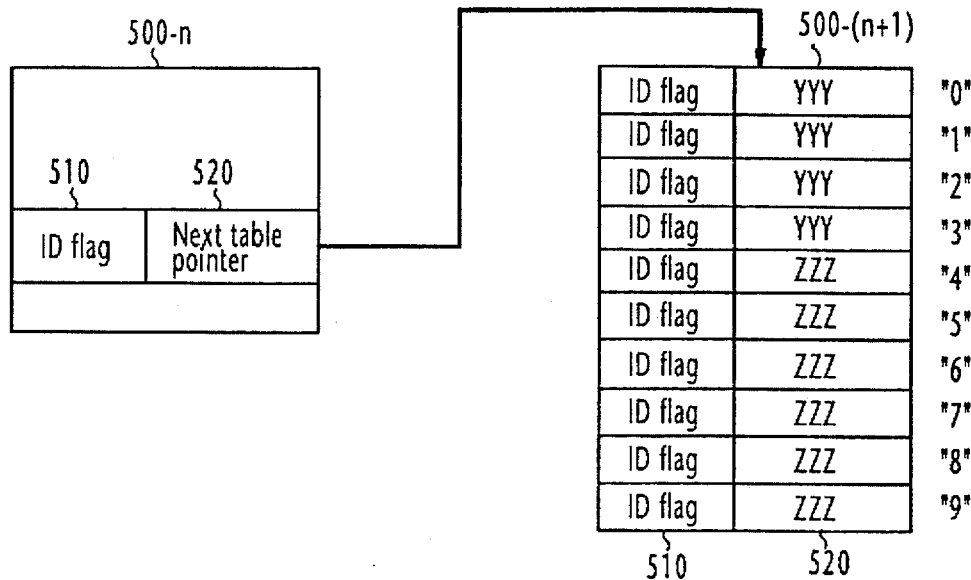
FIGS. 5A and 5B are illustrations of tables in the data base during an integration process.
Figure 5B:
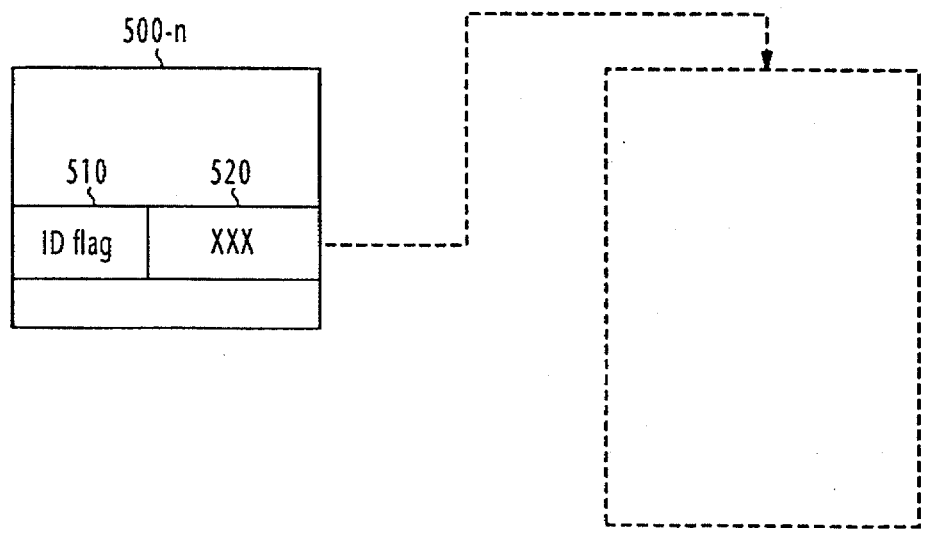

If the registered area code is a four-digit code, numbers 0 to 9 are added to the entered three-digit code, creating ten four-digit codes "1230", "1231", ..., "1239" (step 216). Using these four-digit codes as sortkeys, the data base controller 21 reads data from a table 500-(n+1) as shown in FIG. 5A and checks for the presence of entries corresponding to each code. Since each four-digit code has a corresponding entry (in which either an old route index "YYY" or "ZZZ" is stored as an example), data base controller 21 uses all the four-digit codes to cancel all the data stored in the fourth-digit table 500-(n+1) (step 218), updates the identification flag field of the third-digit table 500-n to indicate that there is no table to follow and replaces the next table pointer in the pointer/index field 520 of table 500-n with the new route index "XXX" as shown in FIG. 5B. In this way, the previous sortkeys "1230" to "1239" are integrated into the new sortkey "123".

If the decision at step 200 indicates that a cancellation mode is entered, flow proceeds to step 220, FIG. 3B, to make a search through the backup data base 52 using the entered destination area code as a sortkey for corresponding tables. At step 221, the number (A) of digits contained in the input area code is compared with the number (B) of the corresponding tables.

If the entered area code has no corresponding tables in the backup data base 52 (i.e., B=0 or A>B), it is determined that the input command has no corresponding registered data and flow proceeds from step 221 to step 222 to provide a display of a command error message on the VDT 40 and flow proceeds to the end of the routine.

If a corresponding set of tables is found in the backup data base (i.e., A=B), flow proceeds from step 221 to step 223 to remove these tables from the data base 52 and proceeds to step 204.

If the number of entered digits is smaller than the number of tables detected in the backup data base 52, it is determined that there is a corresponding set of tables in the backup data base 52, steps 223 to 225 are successively executed in the same manner as steps 216 to 218 (FIG. 3A), so that the last-digit table of the corresponding set is removed from the data base. At step 226, the pointer/index field of the penultimate-digit table of the corresponding set is rewritten from the next table pointer to invalid data indication and updates the corresponding identification flag field, and flow proceeds to step 204.

What is claimed is:

1. A telephone switching system comprising:
   a data base having a plurality of tables linked digit-by-digit by next table pointers in a tree structure to allow routing data stored in the last-digit table to be read out in response to a sortkey;
   a video display terminal for manually entering an area code and routing data; and
   a processor for (a) making a search through the data base for a corresponding tree structure using the entered area code as a sortkey and comparing the number of digits in the entered area code with the number of digits in the corresponding tree structure, (b) creating, in said data base, an (N+1)th table, rewriting an N-th table of the corresponding tree structure with a next table pointer to link the N-th table to the (N+1)th table and writing the entered routing data into the (N+1)th table if the number of digits in the entered area code is N+1 and the number of digits in the corresponding tree structure is N, and (c) removing an (N+1)th table of the corresponding tree structure and rewriting an Nth table of the corresponding tree structure with the entered routing data if the number of digits in the entered area code is N and the number of digits in the corresponding tree structure is N+1.

2. A telephone switching system as claimed in claim 1, wherein the processor includes means responsive to a cancellation command from the video display terminal for removing an (N+1)th table of the corresponding tree structure and rewriting an Nth table of the corresponding tree structure with invalid data if the number of digits in the entered area code is N and the number of digits in the corresponding tree structure is N+1.

3. A telephone switching system comprising:
   a switching network to which lines and trunks are terminated;
   a read/write memory for storing a data base having a plurality of tables linked digit-by-digit by next table pointers in a tree structure to allow routing data stored in the last-digit table to be read out in response to a sortkey;
   a first processor for making a search through the data base in the read/write memory using a sortkey for reading routing data and establishing a connection in said switching network according to the read routing data;
   a backup memory for storing a copy of said data base in the read/write memory;
   a video display terminal for manually entering an area code and routing data; and
   a second processor for performing the steps of:
      a) making a search through the data base in said backup memory for a corresponding tree structure using the entered area code as a sortkey and comparing the number of digits in the entered area code with the number of digits in the corresponding tree structure;
      b) if the number of digits in the entered area code is N+1 and the number of digits in the corresponding tree structure is N, creating, in the data base of the backup memory, an (N+1)th table, rewriting an N-th table of the corresponding tree structure with a next table pointer to link the N-th table to the (N+1)th table and writing the entered routing data into the (N+1)th table;

c) if the number of digits in the entered area code is N and the number of digits in the corresponding tree structure is N+1, removing an (N+1)th table of the corresponding tree structure and rewriting an Nth table of the corresponding tree structure with the entered routing data; and d) copying the data base in said backup memory onto said read/write memory.

4. A telephone switching system as claimed in claim 1, wherein the step (c) further performs the step of responding to a cancellation command from the video display terminal for removing an (N+1)th table of the corresponding tree structure and rewriting an Nth table of the corresponding tree structure with invalid data.

* * * * *